(12) United States Patent  
De Angelis et al.

(10) Patent No.: US 11,591,248 B2  
(45) Date of Patent: Feb. 28, 2023

(54) HEATING APPARATUSES AND METHODS FOR GLASS TUBING MANUFACTURING

(71) Applicant: CORNING INCORPORATED, Corning, NY (US)

(72) Inventors: Gilbert De Angelis, Lindley, NY (US); Dale Madard Fisher, Jr., Painted Post, NY (US); Shripad Joshi, Mason, OH (US); Sowmya Krishnamurthy, Painted Post, NY (US); Elias Panides, Horseheads, NY (US); David Posada-Pineda, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 0 days.

(21) Appl. No.: 15/604,978

(22) Filed: May 25, 2017

(65) Prior Publication Data

US 2017/0341966 A1    Nov. 30, 2017

Related U.S. Application Data

(60) Provisional application No. 62/341,298, filed on May 25, 2016.

(51) Int. Cl.  
*C03B 17/04* (2006.01)

(52) U.S. Cl.  
CPC .................................. *C03B 17/04* (2013.01)

(58) Field of Classification Search  
CPC .......... C03B 7/098; C03B 7/096; C03B 17/04  
See application file for complete search history.

(56) References Cited

U.S. PATENT DOCUMENTS

| 1,539,598 A | * | 5/1925 | Rau | ..................... C03B 7/098 |
| | | | | 65/326 |
| 1,680,543 A | * | 8/1928 | Howard | ................ C03B 7/088 |
| | | | | 373/1 |

(Continued)

FOREIGN PATENT DOCUMENTS

| CN | 103328394 A | 9/2013 |
| JP | H1059729 A | 3/1998 |

(Continued)

OTHER PUBLICATIONS

Eurotherm by Schneider Electric; "Tube Glass" [online]; retrieved from the internet May 25, 2017, <URL: http://www.eurotherm.com/industries/glass/tube-glass/>. pp. 1-3.

(Continued)

*Primary Examiner* — Erin Snelting  
(74) *Attorney, Agent, or Firm* — F. Brock Riggs

(57) ABSTRACT

Heating apparatuses and methods for glass tubing manufacturing are disclosed. A heating apparatus for glass tubing manufacturing includes a bowl configured to receive molten glass and a plurality of heating elements thermally coupled to the bowl. The bowl has a bowl height and includes a tub portion configured to hold the molten glass, a bowl well (Continued)

extending beneath the tub portion, and an orifice at a distal end of the bowl well. The plurality of heating elements include a first heating element disposed at a first vertical location along the bowl height, a second heating element disposed at a second vertical location along the bowl height, wherein the first vertical location is vertically spaced apart from the second vertical location.

9 Claims, 7 Drawing Sheets

(56) References Cited

U.S. PATENT DOCUMENTS

| | | | | |
|---|---|---|---|---|
| 2,009,793 | A | | 7/1935 | Sanchez-Vello |
| 3,078,695 | A | | 2/1963 | Kozak et al. |
| 3,410,675 | A | | 11/1968 | Dockerty |
| 3,740,561 | A | * | 6/1973 | Fleck ............... H01J 9/125 |
| | | | | 250/207 |
| 4,305,747 | A | * | 12/1981 | Kirkman ............ C03B 7/08 |
| | | | | 65/128 |
| 7,480,432 | B2 | * | 1/2009 | Grzybowski .... B29D 11/00384 |
| | | | | 385/52 |
| 10,611,669 | B2 | * | 4/2020 | Thomas ............ C03B 37/0253 |
| 2002/0178753 | A1 | * | 12/2002 | Dick ................. C03B 7/084 |
| | | | | 65/86 |
| 2007/0271963 | A1 | * | 11/2007 | Lange ................ C03B 17/04 |
| | | | | 65/439 |
| 2013/0305784 | A1 | | 11/2013 | Gromann et al. |
| 2015/0307385 | A1 | * | 10/2015 | Klein ................ B33Y 40/00 |
| | | | | 65/29.11 |

FOREIGN PATENT DOCUMENTS

| | | | |
|---|---|---|---|
| JP | 10-287435 | A | 10/1998 |
| JP | 2000344534 | A | 12/2000 |
| JP | 2004252094 | A | 9/2004 |
| JP | 3637178 | B2 | 4/2005 |
| SU | 1763395 | A1 | 9/1992 |

OTHER PUBLICATIONS

International Search Report and Written Opinion dated Sep. 1, 2017, for PCT/US2017/034369 filed May 25, 2017. pp. 1-13.

English Translation of Russian 1st Office Action & Search Report dated Oct. 12, 2020, for RU Patent Application No. 2018144161. pp. 1-15.

Japanese Patent Application No. 2018-561214 Office Action dated Apr. 7, 2021, 6 pages (3 pages of English Translation and 3 pages of Original Document); Japanese Patent Office.

Chinese Patent Application No. 201780032528.9, Office Action dated Jul. 5, 2021, 21 pages (12 pages of English Translation and 9 pages of Original Document); Chinese Patent Office.

English translation of Chinese Office Action dated Jan. 25, 2022, pertaining to Chinese Patent Application No. 201780032528.9.

* cited by examiner

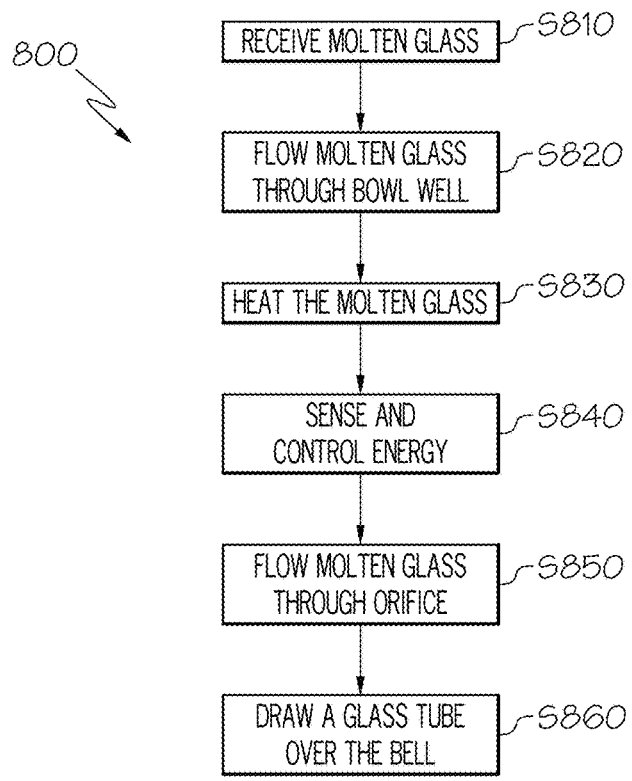
FIG. 8
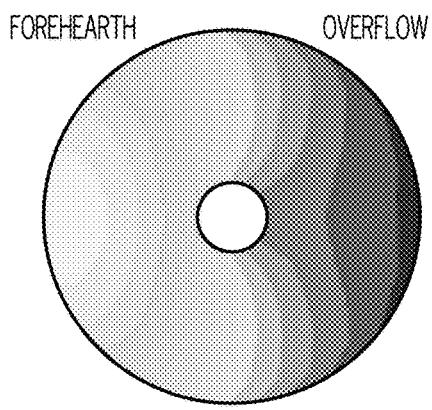 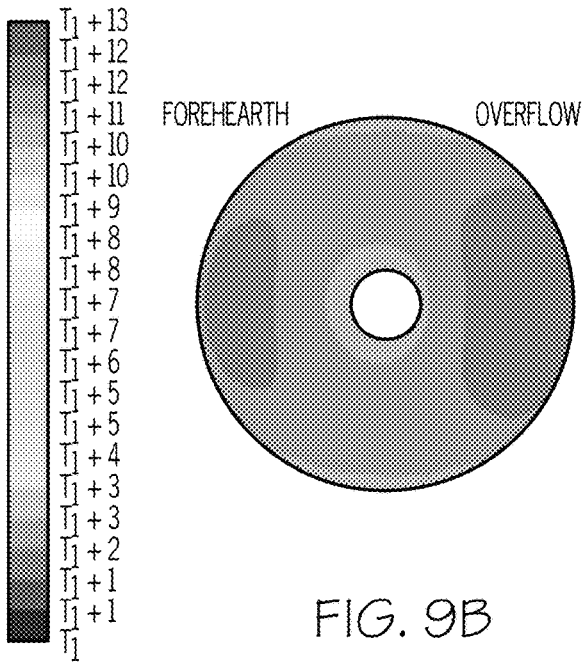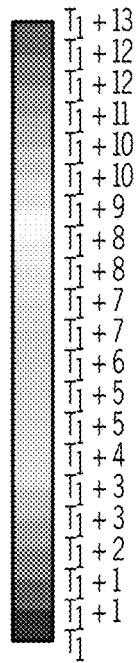
FIG. 9A  FIG. 9B

HEATING APPARATUSES AND METHODS FOR GLASS TUBING MANUFACTURING

CROSS REFERENCE TO RELATED APPLICATIONS

The present application claims priority to U.S. Provisional Application No. 62/341,298 filed May 25, 2016, entitled, "Heating Apparatuses and Methods for Glass Tubing Manufacturing," the entirety of which is incorporated by reference herein.

BACKGROUND

Field

The present specification generally relates to heating apparatuses and methods for glass tubing manufacturing, and more specifically to heating apparatuses and methods for forming glass tubing including a plurality of heating elements disposed at various locations of a bowl used for glass tubing manufacturing.

Technical Background

Glass tubing used in glass articles, such as vials, cartridges, and syringes, requires a high level of dimensional stability in the glass tubing wall. For example, cartridges and syringes have tight dimensional requirements that require minimum concentricity and wall thickness variation. Some industry standards require that wall thickness variations be less than 5% of the product's overall wall thickness. However, dimensional variations in the glass tubing from which the glass articles are formed may result in glass articles with wall thicknesses that are outside of acceptable tolerances. Such dimensional variations may be a result of, for example, non-homogeneous heating of molten glass before the molten glass is drawn into glass tubes in the glass tubing manufacturing process.

Accordingly, a need exists for alternative heating apparatuses for glass tubing manufacturing.

SUMMARY

According to one embodiment, a heating apparatus for glass tubing manufacturing includes a bowl configured to receive molten glass and a plurality of heating elements thermally coupled to the bowl. The bowl has a bowl height, and includes a tub portion configured to hold the molten glass, a bowl well extending beneath the tub portion, and an orifice at a distal end of the bowl well, the distal end being distal to the tub portion. The plurality of heating elements includes a first heating element disposed at a first vertical location along the bowl height, and a second heating element disposed at a second vertical location along the bowl height. The first vertical location is vertically spaced apart from the second vertical location.

In another embodiment, a heating apparatus for glass tubing manufacturing includes a bowl configured to receive molten glass and a plurality of heating elements thermally coupled to the bowl. The bowl includes a tub portion configured to hold the molten glass, a bowl well extending beneath the tub portion, and an orifice at a distal end of the bowl well, the distal end being distal to the tub portion. The bowl well includes having a plurality of bowl well circumferential sectors. The plurality of bowl well circumferential sectors include a first bowl well circumferential sector and a second bowl well circumferential sector. The plurality of heating elements coupled to the bowl well includes a first heating element disposed at the first bowl well circumferential sector, and a second heating element disposed at the second bowl well circumferential sector. The first bowl well circumferential sector is circumferentially spaced apart from the second bowl well circumferential sector.

In yet another embodiment, a method for manufacturing glass tubing includes receiving molten glass in a bowl. The bowl includes a tub portion and a bowl well extending beneath the tub portion. The bowl well includes a plurality of bowl well circumferential sectors, the plurality of bowl well circumferential sectors including a first bowl well circumferential sector and a second bowl well circumferential sector. The method further includes flowing the molten glass from the tub portion through the bowl well, heating the molten glass as it flows through the bowl with a plurality of heating elements, and flowing the molten glass from the bowl well through an orifice at a distal end of the bowl well. The plurality of heating elements are disposed at the plurality of bowl well circumferential sectors. The plurality of heating elements include a first heating element disposed at the first bowl well circumferential sector, and a second heating element disposed at the second bowl well circumferential sector, such that the first bowl well circumferential sector is circumferentially spaced apart from the second bowl well circumferential sector.

Additional features and advantages of the heating apparatuses and methods for glass tubing manufacturing are set forth in the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 8 is a flow chart depicting a method of manufacturing glass tubing according to one or more embodiments shown and described herein;

FIGS. 9A and 9B show the exit temperature profile of molten glass at an orifice when varying amounts of power is applied to the bowl with heating elements at different locations according to one or more embodiments shown and described herein.

DETAILED DESCRIPTION

Figure 1:
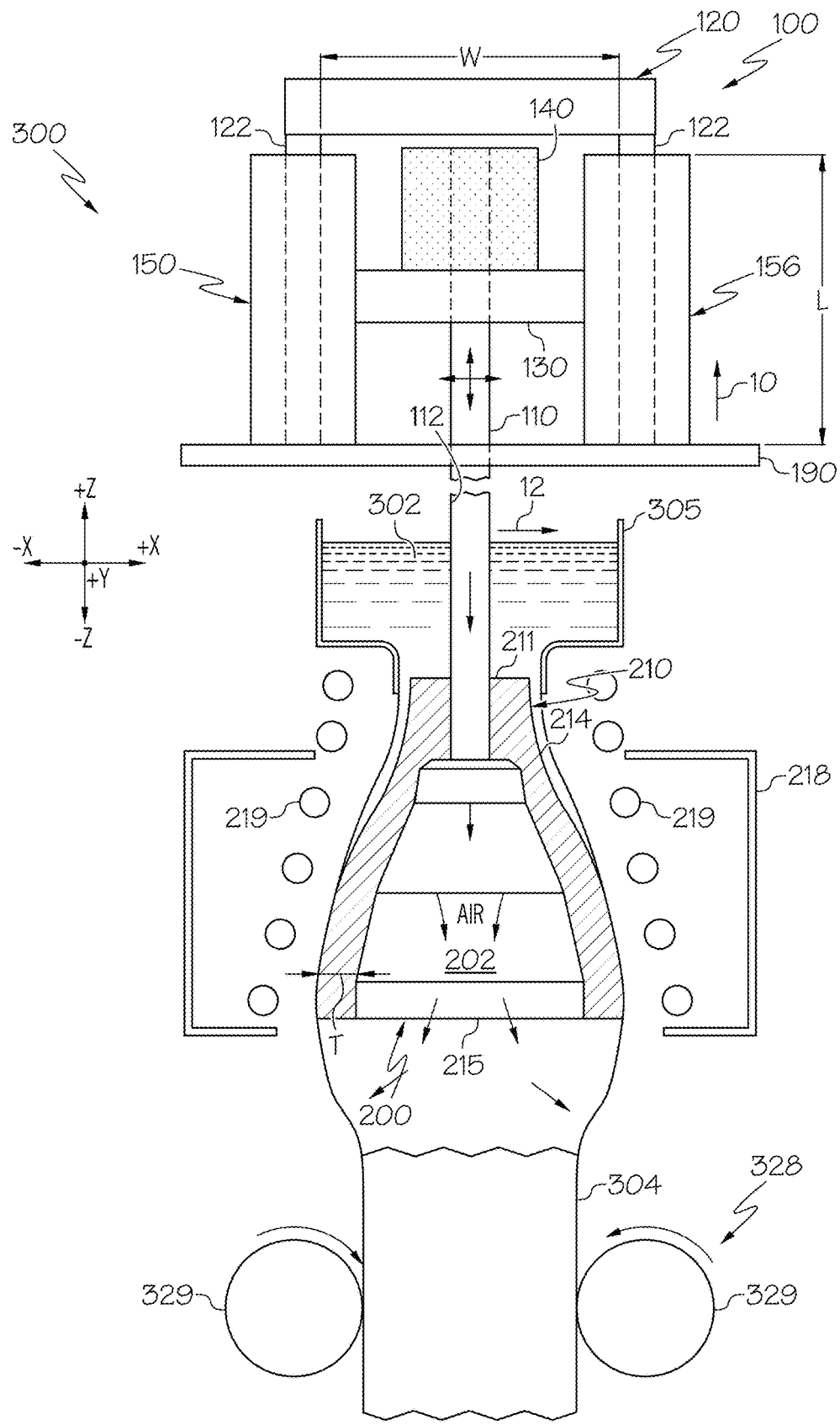
FIG. 1 is a schematic diagram of a glass tubing manufacturing apparatus according to one or more embodiments shown and described herein.

Reference will now be made in detail to various apparatuses and methods for forming glass tubing described herein, examples of which are illustrated in the accompanying drawings. Whenever possible, the same reference numerals will be used throughout the drawings to refer to the same or like parts. Referring generally to the figures, the heating apparatus includes a bowl for receiving molten glass therein. The bowl includes a tub portion, and a bowl well that extends beneath the tub portion. An orifice is disposed at a distal end of the bowl well. The bowl further includes a forehearth opening to receive the molten glass, and an overflow opening to remove overflow molten glass from the tub portion. The heating apparatus includes a plurality of heating elements which are thermally coupled to the bowl such that the plurality of heating elements are disposed at various vertical locations along a bowl height, and/or at various circumferential locations. The heating apparatus is used to heat the molten glass as the molten glass flows from the tub portion through the bowl well and out of the orifice. Specifically, the heating apparatus is configured to maintain thermal homogeneity of the molten glass exiting the orifice which mitigates variation in tube dimensions and instability in the glass tube manufacturing process.

One process for manufacturing glass tubing is the Vello process. The Vello process forms a glass tube by flowing molten glass around a die (also referred to as a "bell," "bell head," or "bell") of a known diameter. Referring now to FIG. 1, a glass tube manufacturing apparatus 300 and a bell positioning apparatus 100 is schematically depicted. FIG. 1 depicts a front view of the glass tube manufacturing apparatus 300 which is generally vertically oriented (i.e., in the +/−Z-direction of the coordinate axes depicted in FIG. 1) such that glass tubing 304 is drawn in the downward vertical direction (i.e., in the −Z-direction of the coordinate axes depicted in FIG. 1).

The bell positioning apparatus 100 includes a frame 120 with at least one frame leg 122 and a platform 130. The at least one frame leg 122 are supported by a base 190 (e.g., a floor). The bell positioning apparatus 100 also has a support positioning device 140. The support positioning device 140 is supported and attached to the platform 130, which, in turn, is supported by the at least one frame leg 122. In embodiments, the support positioning device 140 uses high temperature precision ball screws, linear slides, etc., to provide at least two-axis control (X-Y axis movement shown in FIG. 1), three-axis control (X-Y-Z axis movement shown in FIG. 1) or up to five-axis control of the support 110 with respect to the bottom opening of the bowl 305. The support positioning device 140 can include servo or variable frequency drive (VFD) motion devices that control the high temperature precision ball screws, linear slides, etc. The support positioning device 140 is connected to a support 110. The support 110 is connected to a bell 200 that is part of the glass tube manufacturing apparatus 300. Remote control and feedback from the support 110 can be included as part of the support positioning device 140. The support 110 can have a fluid supply channel 112, such as a pipe, conduit, or similar fluid delivery device, which is fluidly coupled to an internal chamber 202 of the bell 200. The fluid supply channel 112 may be operable to deliver a supply of pressurized fluid to the internal chamber 202. In the embodiments described herein, the pressurized fluid may be a pressurized gas, specifically air or an inert pressurized gas, including, without limitation, nitrogen, helium, argon, krypton, xenon, and the like. The gas supports the interior of the glass tube 304 after it flows past the bell 200 and no longer contacts the side wall 214 of the bell 200 as schematically depicted in FIG. 1. The glass tube manufacturing apparatus 300 includes a bowl 305 for supplying molten glass 302 to flow over the bell 200.

In embodiments, an external heating system 218 with external heating instruments 219 may be disposed around the bell 200. In one embodiment, the external heating system 218 can include an infrared heating system. However, it should be understood that other types of heating units may be used including, without limitation, focused infrared, resistive, induction and/or combinations thereof. Further, it should be understood that, while FIG. 1 depicts the external heating system as being disposed around the bell 200, the external heating system 218 may be integrated with the bell 200, such as when the external heating system 218 is a resistive heating system. Some embodiments may not include the external heating system 218.

Still referring to FIG. 1, the glass tube manufacturing apparatus 300 for forming glass tube may further include a drawing mechanism 328. The drawing mechanism 328 is generally disposed below the bell 200 and may include at least one tractor wheel 329 operable to contact the glass tube drawn over the bell 200 and draw the glass tube downward. In embodiments, the glass tube manufacturing apparatus 300 can extend vertically through one or more floors of a building, structure, etc. In these embodiments, the bell positioning apparatus 100 can be located and supported on one floor (base 190) with the support 110 extending from the support positioning device 140 through the floor (base 190) and through the bowl 305 which is located and supported by a lower floor. In some embodiments, the glass tube manufacturing apparatus 300 with the bell positioning apparatus 100 is structurally isolated from structures, equipment, etc., that can transmit vibrations to the glass tube manufacturing apparatus 300 such as walkways, floors with moving heavy equipment such as forklifts, etc. In embodiments, a glass melting furnace (not shown) rigidly connected to the glass tube manufacturing apparatus 300 can also be structurally isolated from the structures, equipment, etc., that can transmit vibrations to the glass tube manufacturing apparatus 300.

The bell 200 includes a top portion 210 with a top surface 211 and a side wall 214. The side wall 214 and a bottom edge 215 define the internal chamber 202 of the bell 200. The top surface 211 of the top portion 210 has an outer diameter. The bell 200 may have a variety of shapes including, without limitation, a substantially conical shape or, alternatively, a substantially parabolic shape. Accordingly, it should be understood that the bell may be of any shape and/or configuration suitable for expanding and thinning a tube of heated glass (i.e., molten glass) drawn over the surface of the bell. The material from which the bell 200 is formed is stable at elevated temperatures such that the bell 200 does not contaminate heated glass drawn over the bell 200. Examples of suitable bell materials include but are not limited to refractory metals and alloys thereof, platinum-group metals, stainless steels, nickel, nickel-based alloys and ceramics such as, for example, zircon ($ZrSiO_4$) and alumina ($Al_2O_3$). Still referring to FIG. 1, the bowl 305 has an orifice 310 (shown in FIG. 3). A clearance between the top portion 210 and the orifice 310 governs, at least in part, the wall thickness of the glass tube drawn over the bell 200. In addition, and as the bell 200 is bell-shaped or parabolically-shaped, the outer diameter of the bell 200 increases along the length of the bell 200 in a downward direction. The position of the top portion 210 of the bell 200 relative to the orifice 310 may be adjusted to provide uniform flow of the molten glass 302 from the bowl 305 through the orifice 310 and over the bell 200.

Figure 2:
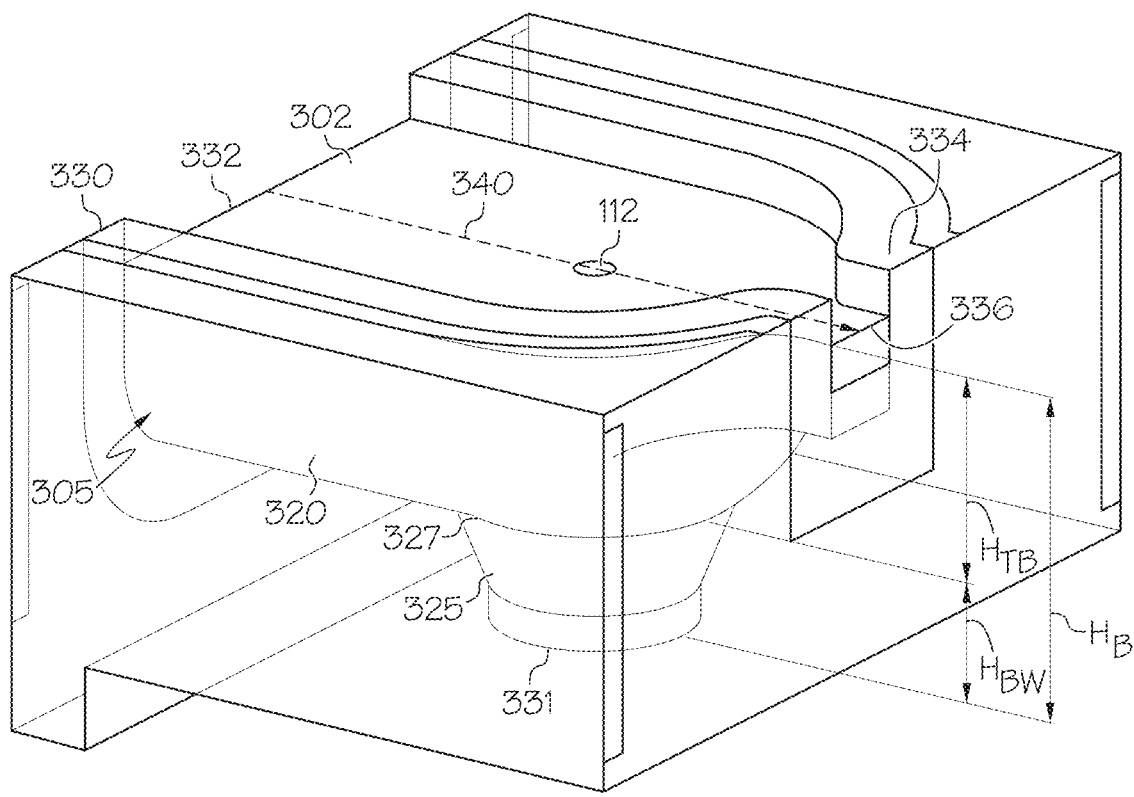
FIG. 2 is a schematic diagram of a bowl having a tub portion and a bowl well according to one or more embodiments shown and described herein.

Now referring to FIG. 2, a perspective view of the bowl 305 is shown. The bowl 305 is configured to receive molten glass 302. The bowl has a bowl height ($H_B$). The bowl 305 includes the tub portion 320 which is configured to hold the molten glass 302. As shown in FIG. 2 the tub portion 320 is shaped in the form of a tub. The tub portion 320 has a tub portion height ($H_{TB}$). The bowl well 325 extends beneath a portion of the tub portion 320. In other embodiments, the bowl well 325 extends beneath an entirety of the tub portion 320 (for example, when the tub portion 320 is circular in cross-section). The bowl well 325 has a proximal end 327, proximal to the tub portion 320 of the bowl 305, and a distal end 331, distal to the tub portion 320. In embodiments, the bowl well 325 may be cylindrical in shape, such that a proximal circumference of the proximal end 327 is equal to a distal circumference of the distal end 331. In some embodiments, the bowl well 325 may be frustoconical in shape such that the proximal circumference is larger than the distal circumference, thereby making the bowl well 325 inwardly tapered towards the distal end 331. In some embodiments, the bowl well 325 may be cylindrically and frustoconically shaped, as shown in FIG. 2. The bowl well 325 has a bowl well height ($H_{BW}$). The tub portion height ($H_{TB}$) and the bowl well height ($H_{BW}$) combined make the bowl height ($H_B$). The bowl 305 further includes the orifice 310 at the distal end 331 of the bowl well 325 (shown in FIG. 3) The fluid supply channel 112, as discussed in FIG. 1 extends through the tub portion 320, the bowl well 325, and the orifice 310.

Still referring to FIG. 2, the bowl further includes a forehearth side 330 and an overflow side 334. The forehearth side 330 has a forehearth opening 332 configured to receive the molten glass 302 into the bowl 305, and an overflow opening 336 configured to remove excess molten glass 302 from the bowl 305. In embodiments, molten glass 302 flows from the forehearth opening 332 towards the overflow opening 336. A bowl axis of symmetry 340 extends between a middle of the forehearth opening 332 to a middle of the overflow opening 336 such that the bowl axis of symmetry 340 bisects the forehearth opening 332 and the overflow opening 336. In embodiments, the bowl axis of symmetry 340 represents the flow of molten glass 302 from the forehearth side 330 to the overflow side 334 of the bowl 305. In embodiments, the bowl axis of symmetry 340 intersects the fluid supply channel 112.

Figure 3:
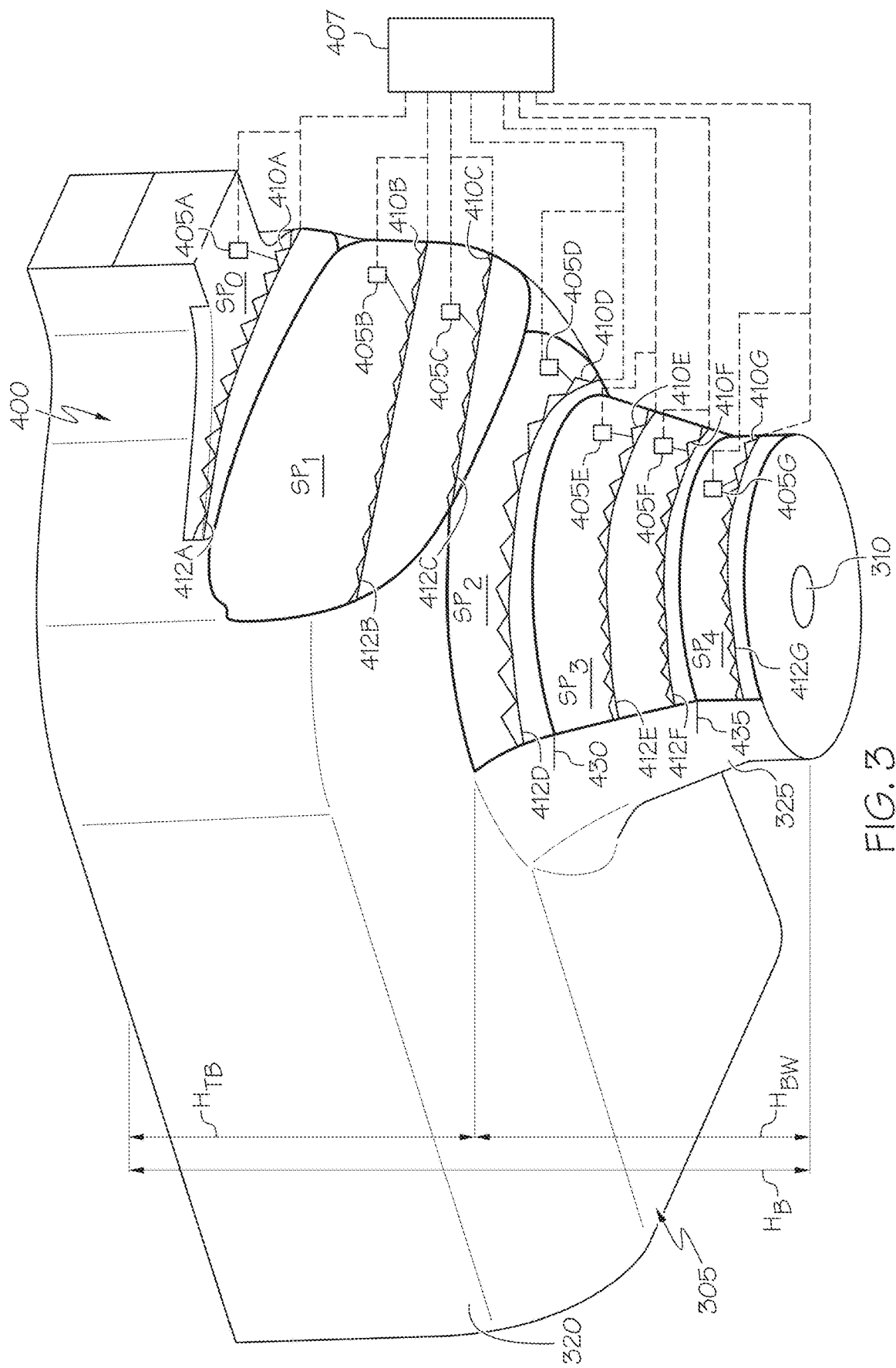
FIG. 3 is a schematic diagram of the bowl of FIG. 2 depicting various locations at which heating elements may be located according to one or more embodiments shown and described herein.

Referring now to FIG. 3, the bowl 305 is shown along with a heating apparatus 400. The heating apparatus 400 includes a plurality of heating elements thermally coupled to the bowl 305. The plurality of heating elements include a first heating element 410A, a second heating element 410B, a third heating element 410C, a fourth heating element 410D, a fifth heating element 410E, a sixth heating element 410F, and a seventh heating element 410G. Further, temperature sensors 405A, 405B, 405C, 405D, 405E, 405F, 405G are thermally coupled to the bowl 305 and configured to sense a temperature of molten glass 302 within the bowl 305. The temperature sensors 405A, 405B, 405C, 405D, 405E, 405F, 405G are communicatively coupled with a controller 407. The controller 407 is configured to control the plurality of heating elements based on the sensed temperature. In some embodiments, only one temperature sensor may be provided which is coupled to one controller 407. In other embodiments, the controller 407 may be integrated with a temperature sensor.

While FIG. 3 shows the plurality of heating elements on the outside of the bowl 305, in embodiments, the plurality of heating elements may be disposed within a walls of the bowl 305 or on the inside of the bowl 305. In embodiments, when the plurality of heating elements are disposed on the inside of the bowl 305, the plurality of heating elements may be covered such that they do not directly contact the molten glass 302. In some embodiments, the plurality of heating elements may be a cartridge heater, a heating rod, a heating filament, a heating wire, heat tape, or the like. In embodiments, the plurality of heating elements are made of metals such as platinum, titanium, tungsten, or the like to withstand high temperatures (between about 1000° C. to about 1900° C.). In some embodiments, two heating elements may be disposed one after another, in which case a resistance coil or a resistance plate is disposed between the two heating elements. In embodiments, the plurality of heating elements may be configured to provide energy within a range of about 0.1 kW to about 10 kW, or within a range of about 0.2 kW to about 1.5 kW, or within a range of about 0.25 kW to about 1.5 kW.

Referring to FIG. 3, the plurality of heating elements may be disposed at a plurality of vertical locations along the bowl height ($H_B$) of bowl 305. The plurality of vertical locations include a first vertical location 412A, a second vertical location 412B, a third vertical location 412C, a fourth vertical location 412D, a fifth vertical location 412E, a sixth vertical location 412F, and a seventh vertical location 412G. In embodiments at least one heating element of a plurality of heating elements may be placed at each vertical location of the plurality of vertical locations. In some embodiments, more than one of the plurality of heating elements may be disposed at each vertical location of the plurality of vertical locations.

As a non-limiting example, the second heating element 410B is disposed at the second vertical location 412B located along the bowl height ($H_B$), and the fifth heating element 410E is disposed at the fifth vertical location 412E located along the bowl height ($H_B$). In embodiments, the second vertical location 412B is vertically spaced apart from the fifth vertical location 412E. In embodiments, as shown in FIG. 3, the second heating element 410B is disposed at the tub portion 320 of the bowl 305, located along the tub portion height ($H_{TB}$), and the fifth heating element 410E is disposed at the bowl well 325, located along the bowl well height ($H_{BW}$). In some embodiments, more than one of the plurality of heating elements may be located in the tub portion 320 of the bowl 305, along the tub portion height ($H_{TB}$). As shown in FIG. 3, the first heating element 410A and the second heating element 410B are both disposed at the tub portion 320 of the bowl, along the tub portion height ($H_{TB}$). In one embodiment, more than one of the plurality of heating elements may be disposed at the bowl well 325, along the bowl well height ($H_{BW}$). For example, as shown in FIG. 3, the fifth heating element 410E and the sixth heating element 410F may be disposed at the bowl well 325 of the bowl 305, along the bowl well height ($H_{BW}$).

In embodiments, the plurality of heating elements are disposed at a plurality of surface portions of the bowl 305. The plurality of surface portions includes a first surface portion ($SP_1$), a second surface portion ($SP_2$), a third surface portion ($SP_3$), and a fourth surface portion ($SP_4$). The plurality of surface portions may also include a flat portion ($SP_0$) underneath the overflow opening 336 in the tub portion 320. As shown in FIG. 3, the plurality of surface portions extend along a segment of the bowl height ($H_B$). For example, one of the plurality of surface portions ($SP_1$) extends along a segment of the tub portion height ($H_{TB}$) of the bowl 305. In another embodiment, another of the plurality of surface portions ($SP_3$) extends along a segment of the bowl well height ($H_{BW}$) of the bowl 305. In some embodiments, a surface portion of the plurality of surface portions may extend along a segment of the tub portion height ($H_{TB}$) and a segment of the bowl well height ($H_{BW}$).

Figure 4:
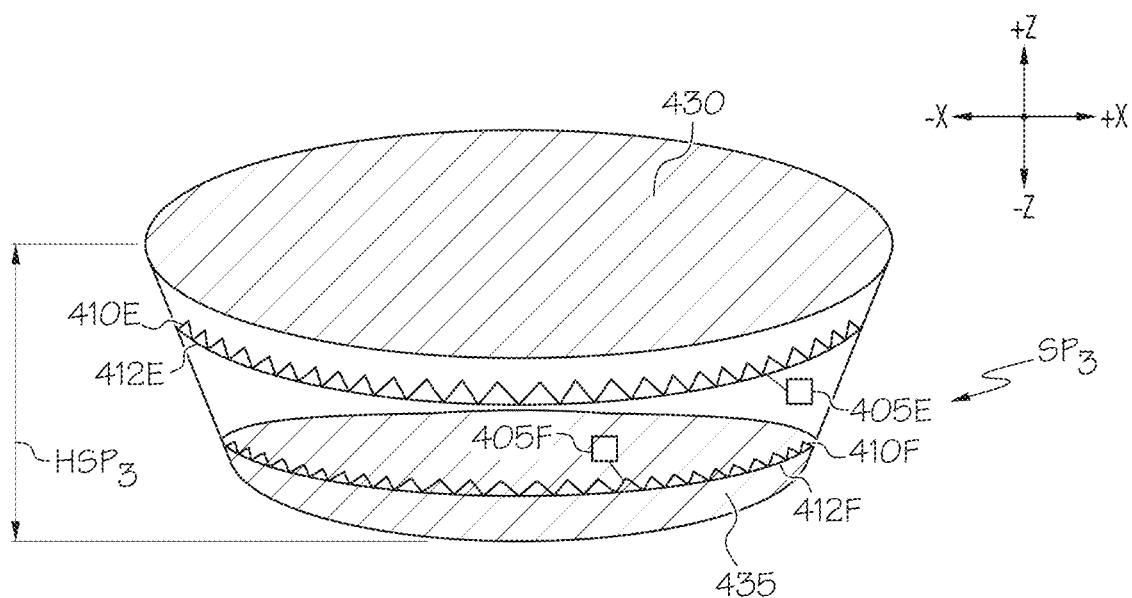
FIG. 4 is a schematic diagram of a heating element disposed at a surface portion of the bowl of the glass manufacturing apparatus according to one or more embodiments shown and described herein.

Briefly referring to FIG. 4 the third surface portion ($SP_3$) of FIG. 3 is depicted. The surface portion ($SP_3$) is a portion extending between an upper portion 430 and a lower portion 435 extending along a segment of the bowl height ($H_B$), and specifically extending along the bowl well height ($H_{BW}$) of the bowl 305. The third surface portion ($SP_3$) includes the surface area of walls of the bowl 305 between the upper portion 430 and the lower portion 435. Third surface portion ($SP_3$) has a surface portion height ($H_{SP3}$). In this embodiment, the third surface portion ($SP_3$) is frustoconical in shape, however, in some embodiments the plurality of surface portions may be cylindrical in shape. Further, the third surface portion ($SP_3$) includes the fifth heating element 410E at the fifth vertical location 412E, and the sixth heating element 410F at the sixth vertical location 412F. In embodiments, the fifth vertical location 412E and the sixth vertical location 412F are each locations along the bowl height ($H_B$) and within the surface portion ($SP_3$)

Referring to FIG. 3, the plurality of surface portions (i.e. $SP_0$, $SP_1$, $SP_2$, $SP_3$, $SP_4$) are shown, where the plurality of heating elements are located at the plurality of surface portions. As a non-limiting example, the second heating element 410B at the second vertical location 412B and the fifth heating element 410E at the fifth vertical location 412E are disposed at different surface portions (410B is at $SP_1$, and 410E is at $SP_3$) of the plurality of surface portions, as shown in FIG. 3. As another non-limiting example, the second heating element 410B at the second vertical location 412B and the third heating element 410C at the third vertical location 412C are disposed at the same surface portion (410B and 410C are at $SP_1$). In one embodiment, all of the plurality of heating elements may be located at one surface portion (for example only in one of $SP_1$, $SP_2$, $SP_3$, or $SP_4$). In such embodiments, the plurality of heating elements may be disposed at different vertical locations of the same surface portion.

The amount of energy provided by the plurality of heating elements is controlled by the controller 407. In some embodiments, the controller 407 is configured to individually control the amount of energy provided by each of the plurality of heating elements based on the sensed temperature provided to the controller 407 by the temperature sensors 405A, 405B, 405C, 405D, 405E, 405F, 405G. In embodiments, the controller 407 is configured to automatically control the energy provided by the plurality of heating elements based on the sensed temperature. While FIG. 3 depicts each temperature sensor 405A, 405B, 405C, 405D, 405E, 405F, 405G coupled to a single controller 407, in some embodiments, each temperature sensor 405A, 405B, 405C, 405D, 405E, 405F, 405G may be coupled to an individual controller. Further, in embodiments, multiple controllers may be coupled to each temperature sensor. In embodiments, temperature of molten glass 302 is required to be greater in the bowl well 325 as compared to the tub portion 320. Once temperature of the molten glass 302 within the tub portion 320 and the bowl well 325 is sensed, energy may be accordingly provided to the plurality of heating elements. To control the heating of molten glass 302, the controller 407 may employ a proportional integral derivative ("PID") control algorithm, a simple on/off control algorithm or any other control algorithm operable to alter the energy provided to the second heating element 410B and the fifth heating element 410E to obtain a desired temperature gradient along the bowl height ($H_B$).

By way of non-limiting examples, referring to FIG. 3, the controller 407 is configured to control the second heating element 410B based on a first sensed temperature of the molten glass 302 sensed by the temperature sensor 405B, and the controller 407 is configured to independently control the fifth heating element 410E based on the first sensed temperature. The first sensed temperature is sensed at the second vertical location 412B. In some embodiments, the controller 407 is configured to control the second heating element 410B based on a first sensed temperature sensed by the temperature sensor 405B, and the controller 407 is configured to independently control the fifth heating element 410E based on a second sensed temperature sensed by the temperature sensor 405E. In this embodiment, the first sensed temperature is taken at the second vertical location 412B, and the second sensed temperature is taken at the fifth vertical location 412E.

Figure 5A:
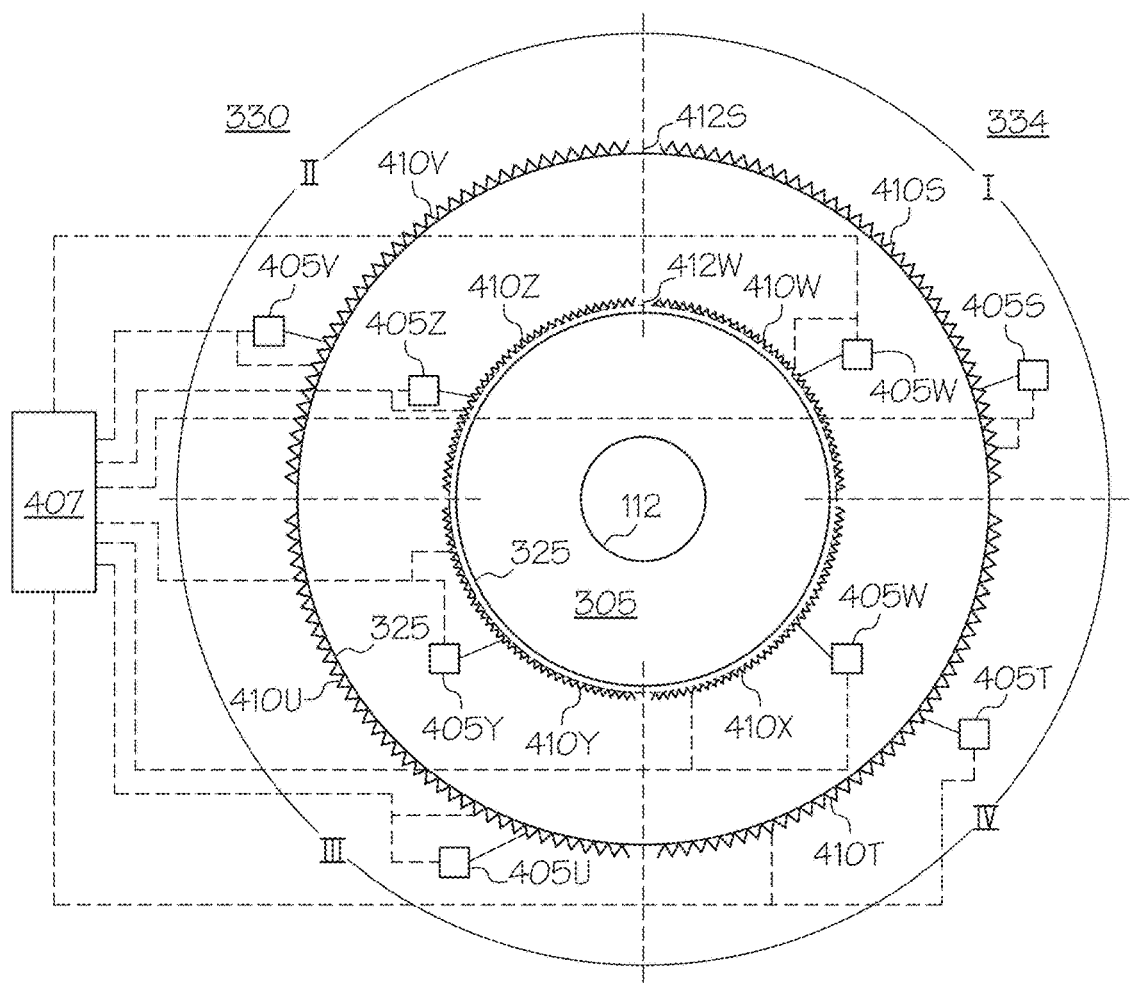
FIG. 5A is a schematic diagram of a top view of the bowl well showing a plurality of bowl well circumferential sectors.
Figure 5B:
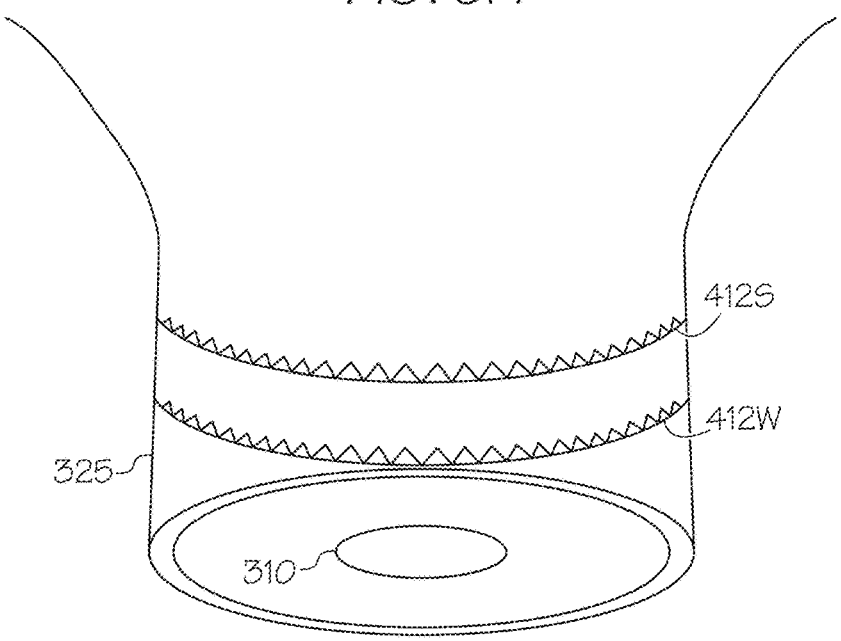
FIG. 5B is a perspective view of the bowl well according to one or more embodiments shown and described herein.

Referring now to FIGS. 5A and 5B, an arrangement of a plurality of heating elements is shown disposed at the bowl well 325 at an eighth vertical location 412S and a ninth vertical location 412W along the bowl well height ($H_{BW}$). FIG. 5A shows a top view of the bowl well 325, and FIG. 5B shows a side view of the bowl well 325. In embodiments, each of the plurality of heating elements may be disposed relative to a plurality of bowl well circumferential sectors of the bowl well 325. The bowl well 325 is segmented into a plurality of bowl well circumferential sectors, including a first bowl well circumferential sector I, a second bowl well circumferential sector II, a third bowl well circumferential sector III, and a fourth vertical circumferential sector IV. While FIG. 5A shows four bowl well circumferential sectors at each vertical location there may be between 1 to 100 sectors, or 2 to 20 sectors, or 5 to 10 sectors at any given vertical location. In embodiments, one portion of the bowl well 325 may be segmented into 4 bowl well circumferential sectors, and another portion of the bowl well 325 may be segmented into 8 bowl well circumferential sectors. In embodiments, each circumferential bowl well sector may vary in size from other circumferential bowl well sectors. In embodiments at least one heating element of a plurality of heating elements may be placed at each bowl well circumferential sector of the plurality of bowl well circumferential sectors. In some embodiments, more than one of the plurality of heating elements may be disposed at each bowl well circumferential sector of the plurality of bowl well circumferential sectors. In embodiments, one heating element of the plurality of heating elements extend across more than one of the plurality of bowl well circumferential sectors. In some embodiments, a strip temperature sensor may be disposed circumferentially across the bowl well circumferential sectors.

Referring to FIGS. 5A and 5B, at an eighth vertical location 412S, an eighth heating element 410S, a ninth heating element 410T, a tenth heating element 410U, and an eleventh heating element 410V, are each disposed at each of the plurality of bowl well circumferential sectors I, II, III, IV respectively. At a ninth vertical location 412W, a twelfth heating element 410W, a thirteenth heating element 410X, a fourteenth heating element 410Y, and a fifteenth heating element 410Z are each disposed at each of the plurality of bowl well circumferential sectors I, II, III, IV respectively.

As shown in FIG. 5A, the twelfth heating element 410W is disposed at the first bowl well circumferential sector I at the ninth vertical location 412W and the eleventh heating element 410V is disposed at a second bowl well circumferential sector II at eighth vertical location 412S. In this embodiment, the first bowl well circumferential sector I is circumferentially spaced apart from the second bowl well circumferential sector II. Therefore, the eleventh heating element 410V and the twelfth heating element 410W are also circumferentially spaced apart from each other. Further, as shown in FIG. 5A, the twelfth heating element 410W is circumferentially and vertically spaced apart from the eleventh heating element 410V. Further, in embodiments, the twelfth heating element 410W at the first bowl well circumferential sector I and fourteenth heating element 410Y at the third bowl well circumferential sector III, are circumferentially spaced apart from each other at the same vertical location (i.e. the ninth vertical location 412W).

Referring to FIG. 5A, the amount of energy provided by the plurality of heating elements is controlled by the controller 407. The controller 407 is configured to individually control the amount of energy provided by each of the plurality of heating elements based on the sensed temperature provided to the controller 407 by the temperature sensors 405S, 405T, 405U, 405V, 405W, 405X, 405Y, 405Z. In embodiments, the controller 407 is configured to control the twelfth heating element 410W based on a first sensed temperature of the molten glass 302 sensed by the temperature sensor 405W, and the controller 407 is configured to independently control the eleventh heating element 410V based on the first sensed temperature. In some embodiments, the controller 407 is configured to control the twelfth heating element 410W based on a first sensed temperature sensed by temperature sensor 405W, and the controller 407 is configured to independently control the eleventh heating element 410V based on a second sensed temperature sensed by temperature sensor 405V. In this embodiment, the first sensed temperature is taken at the ninth vertical location 412W, and the second sensed temperature is taken at the eighth vertical location 412S.

In embodiments, the controller 407 is configured to automatically control the energy provided by the plurality of heating elements based on the sensed temperature. While FIG. 5A depicts each temperature sensor 405S, 405T, 405U, 405V, 405W, 405X, 405Y, 405Z coupled to an individual controller 407, in some embodiments, each temperature sensor may be coupled to an individual controller. The controller 407 may employ the proportional integral derivative ("PID") control algorithm, the simple on/off control algorithm or any other control algorithm operable to alter the energy provided to the plurality of heating elements. In some embodiments, the plurality of heating elements at the plurality of bowl well circumferential sectors disposed at the forehearth side 330 of the bowl well 325 (for example, 410U, 410V, 410Y, 410Z) may be configured to provide lesser energy than the plurality of heating elements at the plurality of bowl well circumferential sectors disposed at the overflow side 334 of the bowl 305 (for example, 410S, 410T, 410W, 410X). This is because molten glass 302 is cooler at the overflow side 334 of the bowl 305 than the forehearth side 330 of the bowl 305 due to longer residence time of the molten glass 302 at the overflow side 334 of the bowl 305. For example, the eighth heating element 410S, and the ninth heating element 410T, (both on the overflow side 334) may provide higher amounts of energy than the tenth heating element 410U, and the eleventh heating element 410V (both on the forehearth side 330). To maintain a minimum cross sectional temperature difference ($\Delta T$) between the forehearth side 330 and the overflow side 334, the molten glass 302 at the overflow side 334 may be preferentially heated compared to the molten glass at the forehearth side 330 of the bowl 305.

Figure 6:
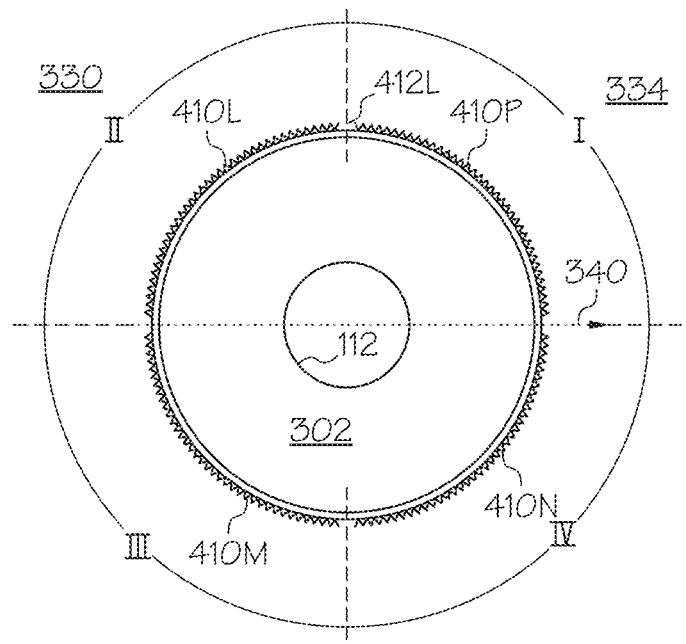
FIG. 6 is a schematic diagram of a top view of the bowl well depicting an arrangement of heating elements with respect to a bowl axis of symmetry according to one or more embodiments shown and described herein.

Referring to FIG. 6, in embodiments, the plurality of heating elements may be arranged in different orientations with respect to the bowl axis of symmetry 340. In embodiments, the bowl axis of symmetry 340 indicates the flow direction of molten glass 302 from the forehearth side 330 to the overflow side 334 of the bowl 305. As a non-limiting example, at tenth vertical location 412L in FIG. 6, a sixteenth heating element 410L is disposed at the second bowl well circumferential sector II, a seventeenth heating element 410M is disposed at the third bowl well circumferential sector III, an eighteenth heating element 410N is disposed at the fourth bowl well circumferential sector IV, and a nineteenth heating element 410P is disposed at the first bowl well circumferential sector I. The sixteenth heating element 410L and the seventeenth heating element 410M may be located in such a manner that the bowl axis of symmetry 340 does not intersect the sixteenth heating element 410L and the seventeenth heating element 410M. In embodiments, the sixteenth heating element 410L and the seventeenth heating element 410M are flanked on either side of the bowl axis of symmetry 340.

Figure 7:
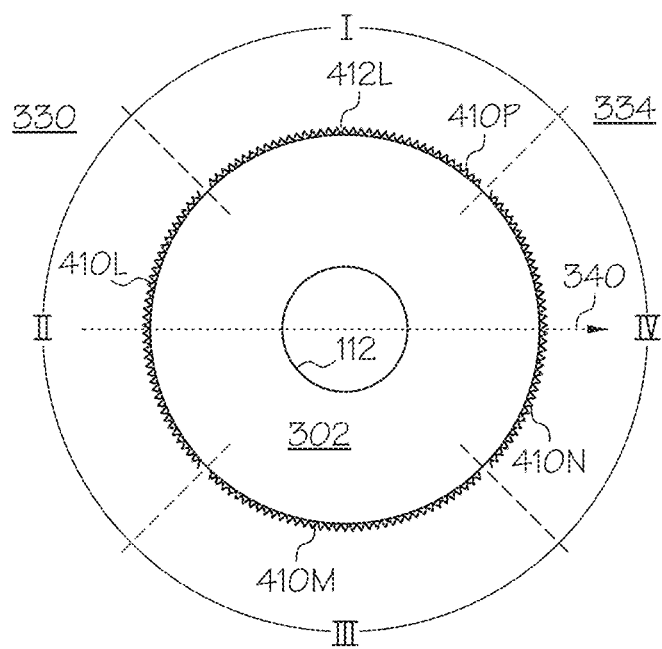
FIG. 7 is a schematic diagram of a top view of the bowl well depicting an alternative arrangement of heating elements with respect to a bowl axis of symmetry according to one or more embodiments shown and described herein.

Referring to FIG. 7, in an alternative embodiment, the sixteenth heating element 410L may be disposed at the second bowl well circumferential sector II at tenth vertical location 412L within the bowl well 325. In this embodiment, the sixteenth heating element 410L is located such that the bowl axis of symmetry 340 intersects the sixteenth heating element 410L (and thereby also intersects the second bowl well circumferential sector II at tenth vertical location 412L). In this embodiment, the sixteenth heating element 410L is located such that the bowl axis of symmetry 340 bisects the sixteenth heating element 410L.

In some embodiments, the plurality of heating elements may be both located at the plurality of vertical heights along the bowl height ($H_B$), as shown in FIG. 3 and located at circumferential sectors at the bowl well 325, as shown in FIG. 5A A method of manufacturing glass tubing using a heating apparatus will now be discussed.

Referring to FIGS. 2 and 8, a method of glass tubing manufacturing 800 includes at step S810 receiving molten glass 302 in a bowl 305 of a glass tube manufacturing apparatus 300. In embodiments, molten glass 302 is received through a forehearth opening 332 at a forehearth side 330 of the bowl 305. The molten glass 302 is received into a tub portion 320 of the bowl 305. The bowl 305 further includes a bowl well 325 extending beneath the tub portion 320 of the bowl 305, and an orifice 310 disposed at a distal end 331 of the bowl well 325, the distal end 331 being distal to the tub portion 320 of the bowl 305. In embodiments, molten glass 302 flows from the forehearth opening 332 towards the overflow opening 336. To indicate the flow direction, a bowl axis of symmetry 340 (as shown in a dotted line in FIG. 2) may be drawn from the forehearth side 330 towards the overflow side 334 of the bowl 305.

Referring to FIGS. 2 and 8, at step S820, the method 800 includes flowing molten glass 302 from the tub portion 320 of the bowl 305 into the bowl well 325. In embodiments where excess molten glass 302 enters the tub portion 320, the excess molten glass 302 is removed from the tub portion 320 through an overflow opening 336 disposed at the overflow side 334 of the bowl 305. As the molten glass 302 flows from the tub portion 320 into the bowl 305, a cross sectional temperature difference ($\Delta T$) arises within the molten glass 302 at the forehearth side 330 and the molten glass 302 at the overflow side 334 in the bowl well 325. This cross sectional temperature difference ($\Delta T$) arises because a residence time of the molten glass 302 at the overflow side 336 of the bowl 305 is more than that of the molten glass 302 at the forehearth side of the bowl 305. Further, when the cross sectional temperature difference ($\Delta T$) of the molten glass 302 within the bowl 305 increases, the glass tubes obtained using such molten glass may result in non-uniform thickness of the tubes, rendering such tubes unfit for use.

Referring to FIGS. 5 and 8, at step S830, the method 800 includes heating the molten glass 302 with the heating apparatus 400, as the molten glass 302 flows through the bowl 305. The molten glass 302 is heated with a plurality of heating elements distributed throughout the bowl 305. The plurality of heating elements may be disposed at the plurality of bowl well circumferential sectors as shown in FIGS. 5A and 5B, where at eighth vertical location 412S the eighth heating element 410S, the ninth heating element 410T, the tenth heating element 410U, and the eleventh heating element 410V, are each disposed at each of the plurality of bowl well circumferential sectors I, II, III, IV respectively. At the ninth vertical location 412W, the twelfth heating element 410W, the thirteenth heating element 410X, the fourteenth heating element 410Y, and the fifteenth heating element 410Z are each disposed at each of the plurality of bowl well circumferential sectors I, II, III, IV respectively.

Further, the method 800 may also include heating the molten glass 302 with plurality of heating elements in different orientations with respect to the bowl axis of symmetry 340. In one embodiment, as shown in FIG. 6, the sixteenth heating element 410L and the seventeenth heating element 410M may be located in such a manner that the bowl axis of symmetry 340 does not intersect the sixteenth heating element 410L and the seventeenth heating element 410M. In embodiments, the sixteenth heating element 410L and the seventeenth heating element 410M are flanked on either side of the bowl axis of symmetry 340. In another embodiment, as shown in FIG. 7, the sixteenth heating element 410L may be disposed at the second bowl well circumferential sector II at tenth vertical location 412L within the bowl well 325. In this embodiment, the sixteenth heating element 410L is located such that the bowl axis of symmetry 340 intersects the sixteenth heating element 410L (and thereby also intersects the second bowl well circumferential sector II at tenth vertical location 412L).

In an alternative embodiment, the method 800 at step S830 may include heating the molten glass 302 as the molten glass 302 flows through the bowl 305 with the plurality of heating elements disposed at a plurality of vertical locations along a bowl height ($H_B$), as shown in FIG. 3. In embodiments, the plurality of vertical locations may be disposed at a plurality of surface portions. In some embodiments, the second heating element 410B may be disposed at the second vertical location 412B, and the fifth heating element 410E may be disposed at the fifth vertical location 412E, such that the second vertical location 412B is vertically spaced apart from the fifth vertical location 412E. In this embodiment, the plurality of heating elements may be disposed at the tub portion 320 and the bowl well 325. In embodiments, step S830 may include heating the molten glass 302 with the plurality of heating elements disposed at a plurality of vertical locations and also disposed at a plurality of bowl well circumferential sectors.

Referring to FIGS. 3, 5A and 8, at step S840, the method 800 includes sensing a temperature of molten glass using temperature sensors 405A . . . 405G, 405S . . . 405Z, and controlling the amount of energy provided by the plurality of heating elements by a controller 407. In embodiments, the bowl 305 is thermally coupled with the temperature sensors 405A . . . 405G, 405S . . . 405Z, which in turn are communicatively coupled with the controller 407. In embodiments, the method 800 includes sensing a temperature gradient along the bowl height ($H_B$), and sensing the cross sectional temperature difference ($\Delta T$) along a cross section of the bowl 305. In the event that the temperature gradient or the cross sectional temperature difference exceeds a pre-determined range, the method 800 may also include the individually controlling each of the plurality of heating elements with the controller 407. Specifically, the controller 407 based on the sensed temperature preferentially provides energy to some of the plurality of heating elements to ensure that the temperature gradient and/or the cross sectional temperature difference ($\Delta T$) returns to the pre-determined range.

The amount of energy provided by each of the plurality of heating elements may be individually controlled by the controller 407. The controller 407 controls the energy provided to each heating element based on the sensed temperature provided by the temperature sensors 405A . . . 405G, 405S . . . 405Z. In embodiments, the controller 407 automatically controls the energy provided by the plurality of heating elements based on the sensed temperature. In embodiments, temperature of molten glass 302 is required to be greater in the bowl well 325 as compared to the tub portion 320. Once temperature of the molten glass 302 within the tub portion 320 and the bowl well 325 is sensed, energy may be accordingly provided to the plurality of heating elements. To control the heating of molten glass 302, the controller 407 may employ a proportional integral derivative ("PID") control algorithm, a simple on/off control algorithm or any other control algorithm operable to alter the energy provided to the second heating element 410B and the fifth heating element 410E to obtain a desired temperature gradient along the bowl height ($H_B$).

By way of non-limiting examples, referring to FIG. 3, the controller 407 controls the second heating element 410B based on a first sensed temperature of the molten glass 302 sensed by the temperature sensor 405B, and the controller 407 independently controls the fifth heating element 410E based on the first sensed temperature. The first sensed temperature is taken at the second vertical location 412B. In some embodiments, the controller 407 controls the second heating element 410B based on a first sensed temperature sensed by the temperature sensor 405B, and the controller 407 independently controls the fifth heating element 410E based on a second sensed temperature sensed by the temperature sensor 405E. In this embodiment, the first sensed temperature is taken at the second vertical location 412B, and the second sensed temperature is taken at the fifth vertical location 412E.

Referring to FIG. 5A, in some embodiments, the plurality of heating elements at the plurality of bowl well circumferential sectors disposed at the forehearth side 330 of the bowl well 325 (for example, 410U, 410V, 410Y, 410Z) may provide lesser energy than the plurality of heating elements at the plurality of bowl well circumferential sectors disposed at the overflow side 334 of the bowl 305 (for example, 410S, 410T, 410W, 410X). For example, the controller 407 controls the eighth heating element 410S and the ninth heating element 410T, (both on the overflow side 334) to provide higher amounts of energy than the tenth heating element 410U, and the eleventh heating element 410V (both on the forehearth side 330).

In some embodiments, Referring to FIGS. 1 and 8, at step S850, the method 800 includes flowing molten glass 302 from the bowl well 325 through the orifice 310 at the distal end 331 of the bowl well 325. As the molten glass 302 is flowing through the orifice 310, the molten glass 302 may be flown over a bell 200. While the molten glass 302 flows through the orifice 310 a pressurized fluid is blown through a fluid supply channel 112. As the pressurized fluid is flowing through the fluid supply channel 112, a glass tube is drawn over the bell 200 at step S860.

It should be understood that the present application is directed towards heating apparatuses and methods for glass tubing manufacturing. The heating apparatus for glass tubing manufacturing includes the bowl having the tub portion configured to hold the molten glass, the bowl well extending beneath the tub portion, and the orifice. The heating apparatus is thermally coupled to the bowl and includes the plurality of heating elements. The plurality of heating elements are disposed at various locations within the bowl, and are controlled by the controller to heat the molten glass within the bowl. Specifically, the heating apparatus is configured to maintain thermal homogeneity of the molten glass exiting the orifice which mitigates variation in tube dimensions and instability in the glass tube manufacturing process.

EXAMPLES

The embodiments described herein will be further clarified by the following non-limiting examples.

The following data was obtained using computational fluid dynamics (CFD) where a model of the bowl 305 including the tub portion 320 and the bowl well 325 and the orifice 310 was set up. Multiple cases were evaluated with a range of energy supplied to the above discussed locations within the bowl 305 using the plurality of heating elements. CFD software (Fluent) was used to calculate temperature values.

Example 1

Referring to FIGS. 9A and 9B, exemplary non-limiting math models were constructed to compare cross sectional temperature ($\Delta T$) of the molten glass 302 between the forehearth side 330 and the overflow side 334 in the bowl 305. Specifically, a model was created when no energy was supplied to the bowl 305. Additionally various models were created when energy was supplied using the plurality of heating elements individually at various surface portions ($SP_1$, $SP_2$, $SP_3$, and $SP_4$) and combined at all surface portions. The surface portions ($SP_1$, $SP_2$, $SP_3$, and $SP_4$) are as shown in FIG. 3. FIGS. 9A and 9B show the glass temperature exiting the bowl 305. As can be seen in FIG. 9A, when no power was provided within the bowl 305, the cross sectional temperature ($\Delta T$) can be seen to be $T_{max}$. Further $P_{min}$ indicates the minimum amount of power (kW) applied, and when $P_{min}+0.25$ kW of power was applied using the plurality of heating elements only at surface portion ($SP_2$), the cross sectional temperature ($\Delta T$) was observed at $T_{min}$.

Additionally, as seen in FIG. 9A, temperature of molten glass 302 at the forehearth side 330 of the bowl 305 and the overflow side 334 of the bowl 305 ranges between a temperature $T_1$ and $T_1+13°$ C. However, as shown in FIG. 9B, when power is applied to the bowl 305 as tabulated in Table 1 below, the cross sectional temperature ($\Delta T$) between the forehearth side 330 and the overflow side 334 decreases.

Table 1 shows the amount of power applied at different surface portions, and the resultant cross sectional temperature ($\Delta T$) of the molten glass 302 exiting the bowl 305 through the orifice 310.

TABLE 1

Models with Bowl with Plurality of Heating Elements

| Case | Region with Power | Power (kW) | $\Delta T$ |
|---|---|---|---|
| 1 | No Power | 0 | $T_{max}$ (= $T_{min}$ + 7) |
| 2 | Flat- | $P_{min}$ | $T_{min}$ + 5 |
| 3 | Surface portion ($SP_1$) | $P_{min}$ | $T_{min}$ + 2 |
| 4 | Surface portion ($SP_1$) | $P_{min}$ + 0.5 | $T_{min}$ + 1 |
| 6 | Surface portion ($SP_2$) | $P_{min}$ + 0.25 | $T_{min}$ |
| 7 | Surface portion ($SP_3$) | $P_{min}$ + 0.25 | $T_{min}$ + 4 |
| 8 | Surface portion ($SP_3$) | $P_{min}$ | $T_{min}$ + 2 |
| 10 | Surface portion ($SP_4$) | $P_{min}/4$ | $T_{min}$ + 5 |
| 11 | Combination of Surface Portions ($SP_1$, $SP_2$, $SP_3$, and $SP_4$) | $P_{min}$ | $T_{min}$ + 7 to $T_{min}$ + 3 |

Example 2

Figure 10A:
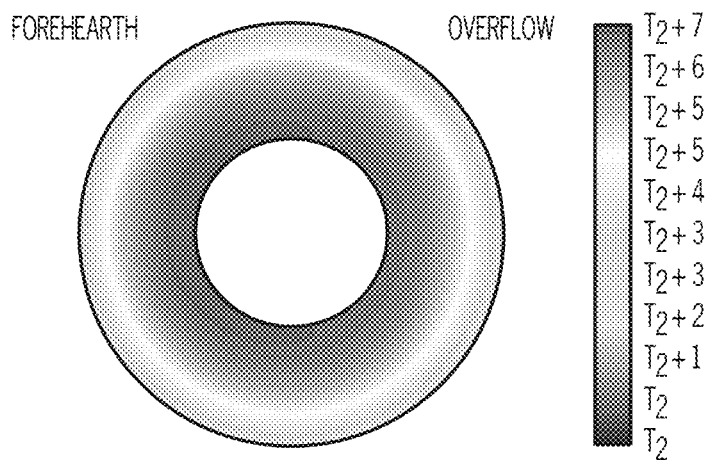
FIGS. 10A and 10B show the exit temperature profile of molten glass at an orifice when varying amounts of power is applied to the bowl with heating elements at different circumferential sectors, with FIG. 10C showing the arrangement of the heating elements according to one or more embodiments shown and described herein.
Figure 10B:
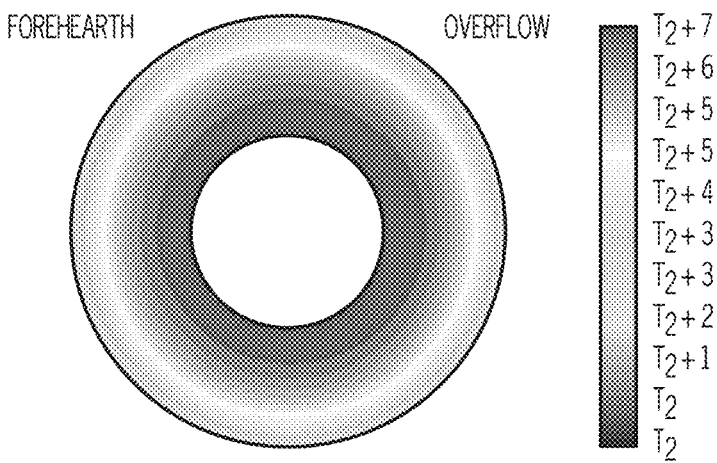
Figure 10C:
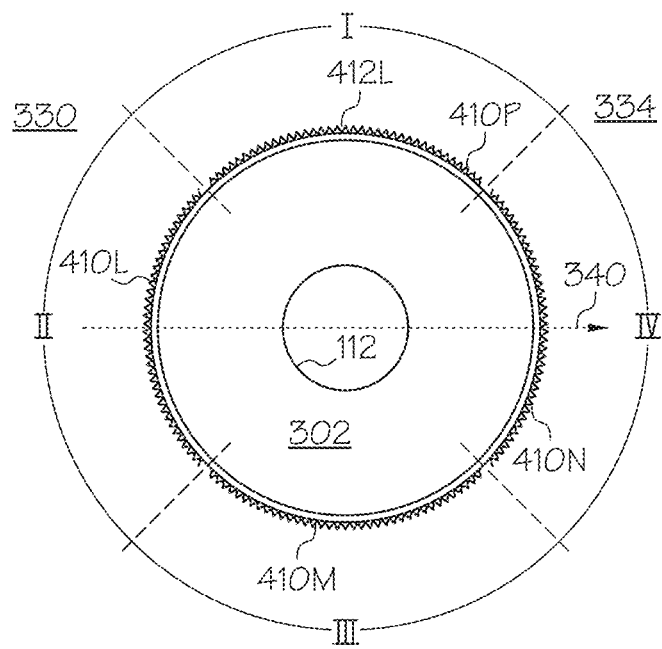

Referring to FIGS. 10A and 10B, exemplary non-limiting models were also developed to compare no power supplied to the bowl well 325 (FIG. 10A), with the bowl well 325 being supplied by power (FIG. 10B) when plurality of heating elements were arranged as described in FIG. 7 and reproduced as FIG. 10C.

As shown in FIG. 10C, the sixteenth heating element 410L is disposed such that the bowl axis of symmetry 340 bisects the sixteenth heating element 410L. In addition to the sixteenth heating element 410L, the seventeenth heating element 410M, the eighteenth heating element 410N, and the nineteenth heating element 410P are configured to provide unequal amounts of power. The sixteenth heating element 410L was configured to provide 0 kW, the seventeenth heating element 410M and the nineteenth heating element 410P were each configured to provide $P_{min}$, kW of power, and the eighteenth heating element 410N was configured to provide $P_{min}+20$ kW. Therefore, the overflow side 334 of the bowl 305 was preferentially heated using the individually controlled plurality of heating elements.

FIG. 10A shows the exit profile of the temperature of the molten glass 302 when no power was provided throughout the bowl well 325. Temperatures shown in FIG. 10A range from a temperature $T_2$ to about $T_2+7°$ C. Due to shorter residence time, molten glass 302 from the forehearth side 330 of the bowl 305 is hotter than the molten glass on the overflow side 332 which leads to circumferential thermal non-homogeneity in molten glass 302 exiting the orifice 310. As can be seen in the exit profile of FIG. 10B, when power was provided by the heating elements as described above with respect to FIG. 10C, the thermal non-homogeneity in molten glass 302 was resolved by preferentially heating using the individually controlled plurality of heating elements as described above.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A heating apparatus for glass tubing manufacturing comprising:
 a bowl configured to receive molten glass, the bowl including a forehearth side and an overflow side and having a bowl height and comprising:
  a tub portion configured to hold the molten glass;
  a bowl well extending beneath the tub portion having a plurality of bowl well sectors, the plurality of bowl well sectors comprising a first bowl well sector and a second bowl well sector; and
  an orifice at a distal end of the bowl well, the distal end being distal to the tub portion; and
 a plurality of heating elements disposed at the bowl, the plurality of heating elements comprising:
  a first heating element disposed at the first bowl well sector and disposed at the forehearth side; and
  a second heating element disposed at the second bowl well sector and disposed at the overflow side, wherein the first bowl well sector is circumferentially adjacent to the second bowl well sector;
 a first temperature sensor disposed at the first bowl well sector and configured to sense a first temperature and a second temperature sensor disposed at the second bowl well sector and configured to sense a second temperature; and
 a controller communicatively coupled with the first temperature sensor and the second temperature sensor,
 wherein the controller:
 determines a cross sectional temperature difference based on the first temperature and the second temperature,
 determines whether the cross sectional temperature difference exceeds a predetermined range,
 in response to determining that the cross sectional temperature difference exceeds a predetermined range, controls the first heating element based on the first temperature, and controls the second heating element based on the second temperature and controls the first heating element to provide less energy than the second heating element, and
 the first heating element and the second heating element are disposed at the same vertical location along the bowl height.

2. The heating apparatus of claim 1, further comprising:
 a third heating element disposed at another vertical location along the bowl height,
 wherein the first heating element is vertically spaced apart from the third heating element.

3. The heating apparatus of claim 1, wherein a heating element of the plurality of heating elements is placed at each bowl well sector of four bowl well sectors.

4. The heating apparatus of claim 3, wherein the first heating element at the first bowl well sector intersects a bowl reference line when viewed from a top of the heating apparatus.

5. The heating apparatus of claim 1, wherein the overflow side includes an overflow opening configured to remove an excess of the molten glass from the bowl.

6. The heating apparatus of claim 1, wherein the forehearth side includes a forehearth opening configured to receive the molten glass into the bowl.

7. A method for manufacturing glass tubing comprising:
 receiving molten glass in a bowl, the bowl including a forehearth side and an overflow side and having a bowl height, and the bowl comprising a tub portion and a bowl well extending beneath the tub portion, the bowl well comprising a plurality of bowl well sectors, the plurality of bowl well sectors comprising a first bowl well sector and a second bowl well sector;
 flowing the molten glass from the tub portion through the bowl well;
 heating the molten glass as it flows through the bowl with a plurality of heating elements, the plurality of heating elements disposed at the plurality of bowl well sectors;
 sensing at least one temperature using temperature sensors attached to the bowl;
 controlling the plurality of heating elements based on the at least one sensed temperature; and
 flowing the molten glass from the bowl well through an orifice at a distal end of the bowl well,
 wherein the plurality of heating elements comprises a first heating element disposed at the first bowl well sector and disposed at the forehearth side, and a second heating element disposed at the second bowl well sector and disposed at the overflow side, wherein the first bowl well sector is circumferentially adjacent to the second bowl well sector,
 wherein the temperature sensors comprise a first temperature sensor disposed at the first bowl well sector and configured to sense a first temperature and a second temperature sensor disposed at the second bowl well sector and configured to sense a second temperature, and the first heating element and the second heating element are disposed at the same vertical location along the bowl height, and
 wherein the controlling the plurality of heating elements comprises:
  determining a cross sectional temperature difference based on the first temperature and the second temperature,
  determining whether the cross sectional temperature difference exceeds a predetermined range,
  in response to determining that the cross sectional temperature difference exceeds a predetermined range, controlling the first heating element based on the first temperature, and controlling the second heating element based on the second temperature and controlling the first heating element to provide less energy than the second heating element, and.

8. The method of claim 7 further comprising:
 blowing a fluid through a fluid supply channel to deliver a supply of pressurized fluid to an internal chamber of a bell disposed below the bowl; and
 drawing a glass tube over the bell.

9. The method of claim 7, wherein:
the first heating element is arranged within the bowl well at one of the plurality of bowl well circumferential sectors such that a bowl centerline intersects the first heating element.

\* \* \* \* \*